US012743848B2

(12) United States Patent
Xu et al.

(10) Patent No.: US 12,743,848 B2
(45) Date of Patent: Sep. 22, 2026

(54) VIRTUAL-CAMERA-BASED IMAGE ACQUISITION METHOD AND RELATED APPARATUS

(71) Applicant: TENCENT TECHNOLOGY (SHENZHEN) COMPANY LIMITED, Shenzhen (CN)

(72) Inventors: Yiting Xu, Shenzhen (CN); Yi Zhou, Shenzhen (CN); Xiaoming Yu, Shenzhen (CN); Yang Yi, Shenzhen (CN); Chengwei Peng, Shenzhen (CN); Feng Li, Shenzhen (CN); Xiaoxiang Zuo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 36 days.

(21) Appl. No.: 18/667,669

(22) Filed: May 17, 2024

(65) Prior Publication Data

US 2024/0303921 A1 Sep. 12, 2024

Related U.S. Application Data

(63) Continuation of application No. PCT/CN2023/095669, filed on May 23, 2023.

(30) Foreign Application Priority Data

Jul. 22, 2022 (CN) ........................ 202210870825.3

(51) Int. Cl.
*G06T 17/00* (2006.01)
*G06T 7/73* (2017.01)

(52) U.S. Cl.
CPC ............... *G06T 17/00* (2013.01); *G06T 7/75* (2017.01); *G06T 2207/30244* (2013.01)

(58) Field of Classification Search
CPC ......... G06T 15/205; G06T 7/75; G06T 17/00; G06T 15/20; G06T 7/73; G06T 2207/30244

(Continued)

(56) References Cited

U.S. PATENT DOCUMENTS

2012/0169842 A1* 7/2012 Chuang .................. H04N 7/181 348/E7.001
2016/0292865 A1* 10/2016 Floor ..................... H04N 23/90

(Continued)

FOREIGN PATENT DOCUMENTS

CN 111447340 A 7/2020
CN 113137955 A 7/2021

(Continued)

OTHER PUBLICATIONS

X. Luo, L. Wang, S. Wang and X. Jiang, "Estimate the attitude of the camera from the railway-environment images," 2014 12th International Conference on Signal Processing (ICSP), Hangzhou, China, 2014, pp. 1186-1189, doi: 10.1109/ICOSP.2014.7015187.*

(Continued)

*Primary Examiner* — Phu K Nguyen
(74) *Attorney, Agent, or Firm* — Anova Law Group, PLLC

(57) ABSTRACT

An image acquisition method includes importing a three-dimensional model of an object into a three-dimensional virtual photographing scene having a virtual world coordinate system, determining model position information and model attitude information of the three-dimensional model in the virtual world coordinate system, determining, according to a layout pattern of a plurality of virtual cameras in the three-dimensional virtual photographing scene, camera position information and camera attitude information of each of the plurality of virtual cameras in the virtual world (Continued)

coordinate system, and acquiring, for each of the plurality of virtual cameras, an image of the object from a viewing angle of the virtual camera according to the model position information, the model attitude information, the camera position information, and the camera attitude information.

18 Claims, 9 Drawing Sheets

(58) Field of Classification Search
USPC .......................................................... 345/418
See application file for complete search history.

(56) References Cited

U.S. PATENT DOCUMENTS

| | | | | |
|---|---|---|---|---|
| 2018/0341812 | A1* | 11/2018 | Floor | G06V 20/42 |
| 2023/0098633 | A1* | 3/2023 | Takama | G06T 7/0002 345/204 |
| 2023/0342973 | A1* | 10/2023 | Chen | G06T 11/00 |
| 2024/0303921 | A1* | 9/2024 | Xu | G06T 15/205 |

FOREIGN PATENT DOCUMENTS

| | | | | |
|---|---|---|---|---|
| CN | 113205591 | A | 8/2021 | |
| CN | 113870163 | A | 12/2021 | |
| CN | 114095662 | A | 2/2022 | |
| CN | 114511662 | A | 5/2022 | |
| CN | 114519742 | A | 5/2022 | |
| CN | 113137955 | B * | 8/2022 | G01C 11/08 |
| WO | 2021227360 | A1 | 11/2021 | |
| WO | WO-2023166794 | A1 * | 9/2023 | G06T 15/04 |

OTHER PUBLICATIONS

Guo K, Ye H, Gu J, Chen H. A novel method for intrinsic and extrinsic parameters estimation by solving perspective-three-point problem with known camera position. Applied Sciences. Jun. 28, 2021;11(13):6014.*

Karsch K, Sunkavalli K, Hadap S, Carr N, Jin H, Fonte R, Sittig M, Forsyth D. Automatic scene inference for 3d object compositing. ACM Transactions on Graphics (TOG). Jun. 2, 2014;33(3):1-5.*

The World Intellectual Property Organization (WIPO) International Search Report for PCT/CN2023/095669 Jul. 20, 2023 6 Pages (including translation).

China National Intellectual Property Administration (CNIPA) Office Action 1 for Application No. 202210870825.3, Feb. 28, 2026 8 Pages (including translation).

China National Intellectual Property Administration (CNIPA) Office Action 2 for Application No. 202210870825.3 Jun. 30, 2026 15 Pages (including translation).

Martijn Courteaux et al. "Silvr: A synthetic immersive large-volume plenoptic dataset." Proceedings of the 13th ACM Multimedia Systems Conference. 2022.

* cited by examiner (a) (b)

(a)

(b)

VIRTUAL-CAMERA-BASED IMAGE ACQUISITION METHOD AND RELATED APPARATUS

CROSS-REFERENCE TO RELATED APPLICATIONS

This application is a continuation of International Application No. PCT/CN2023/095669, filed on May 23, 2023, which claims priority to Chinese Patent Application No. 202210870825.3, filed with the China National Intellectual Property Administration on Jul. 22, 2022 and entitled "CAMERA-BASED IMAGE ACQUISITION METHOD AND RELATED APPARATUS," the entire contents of both of which are incorporated herein by reference.

FIELD OF THE TECHNOLOGY

This application relates to the field of image acquisition, and in particular, to virtual-camera-based image acquisition.

BACKGROUND OF THE DISCLOSURE

Currently, with the rapid development of a three-dimensional vision technology, to implement high-precision three-dimensional reconstruction and rendering of a to-be-photographed object in a three-dimensional photographing scene such as a video conference, so as to enhance the realism and immersion of the photographing scene such as a video conference, it is necessary to acquire photographed images from viewing angles of a plurality of cameras by using the three-dimensional vision technology to provide a basis for subsequent high-precision three-dimensional reconstruction and rendering.

In related art, acquiring photographed images from viewing angles of a plurality of cameras by using a three-dimensional vision technology means: first, camera type selection is performed and a plurality of physical cameras are selected, then the plurality of physical cameras are built on site to form a hardware camera acquisition system, and finally, time synchronization is performed on the plurality of physical cameras, so that the plurality of physical cameras can synchronously acquire photographed images from viewing angles of the plurality of physical cameras.

However, because each implementation step in the foregoing method is cumbersome and complicated and is limited by factors such as environment and hardware, it is difficult to ensure operation accuracy of each implementation step. This not only consumes a large amount of time and efforts, but also requires high hardware costs, resulting in great reduction of efficiency and an effect of acquiring the photographed images from the viewing angles of the plurality of cameras.

SUMMARY

In accordance with the disclosure, there is provided an image acquisition method including importing a three-dimensional model of an object into a three-dimensional virtual photographing scene having a virtual world coordinate system, determining model position information and model attitude information of the three-dimensional model in the virtual world coordinate system, determining, according to a layout pattern of a plurality of virtual cameras in the three-dimensional virtual photographing scene, camera position information and camera attitude information of each of the plurality of virtual cameras in the virtual world coordinate system, and acquiring, for each of the plurality of virtual cameras, an image of the object from a viewing angle of the virtual camera according to the model position information, the model attitude information, the camera position information, and the camera attitude information.

Also in accordance with the disclosure, there is provided a computer device including one or more processors, and one or more memories storing one or more computer programs that, when executed by the one or more processors, cause the one or more processors to import a three-dimensional model of an object into a three-dimensional virtual photographing scene having a virtual world coordinate system, determine model position information and model attitude information of the three-dimensional model in the virtual world coordinate system, determine, according to a layout pattern of a plurality of virtual cameras in the three-dimensional virtual photographing scene, camera position information and camera attitude information of each of the plurality of virtual cameras in the virtual world coordinate system, and acquire, for each of the plurality of virtual cameras, an image of the object from a viewing angle of the virtual camera according to the model position information, the model attitude information, the camera position information, and the camera attitude information.

Also in accordance with the disclosure, there is provided a non-transitory computer-readable storage medium storing one or more computer programs that, when executed by one or more processors, cause the one or more processors to import a three-dimensional model of an object into a three-dimensional virtual photographing scene having a virtual world coordinate system, determine model position information and model attitude information of the three-dimensional model in the virtual world coordinate system, determine, according to a layout pattern of a plurality of virtual cameras in the three-dimensional virtual photographing scene, camera position information and camera attitude information of each of the plurality of virtual cameras in the virtual world coordinate system, and acquire, for each of the plurality of virtual cameras, an image of the object from a viewing angle of the virtual camera according to the model position information, the model attitude information, the camera position information, and the camera attitude information.

DESCRIPTION OF EMBODIMENTS

The following describes the embodiments of this application with reference to the accompanying drawings.

Figure 1:
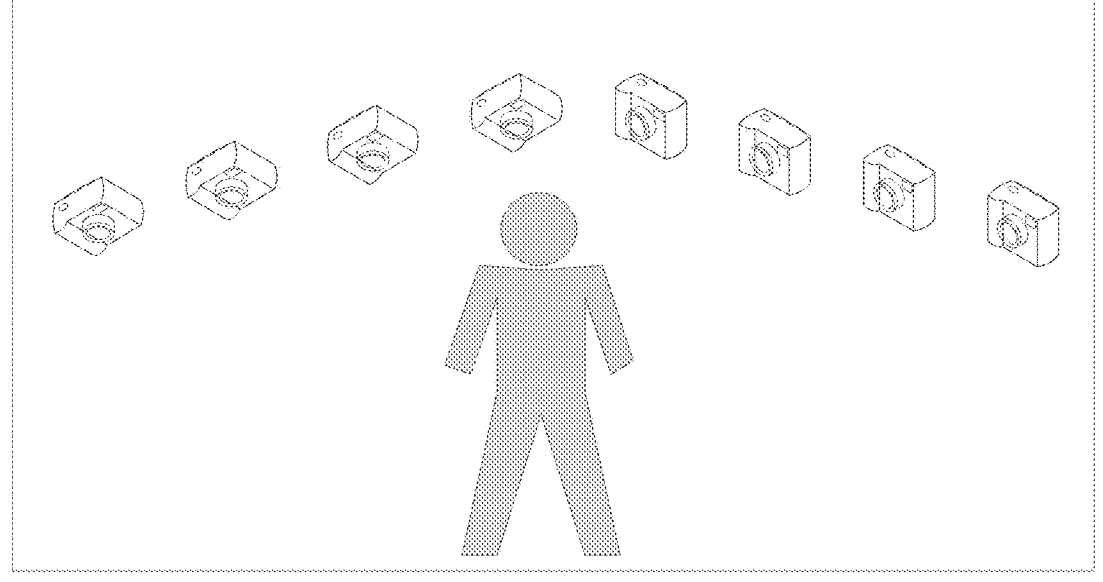
FIG. 1 is a schematic diagram showing eight physical cameras forming a hardware camera acquisition system.
Figure 2:
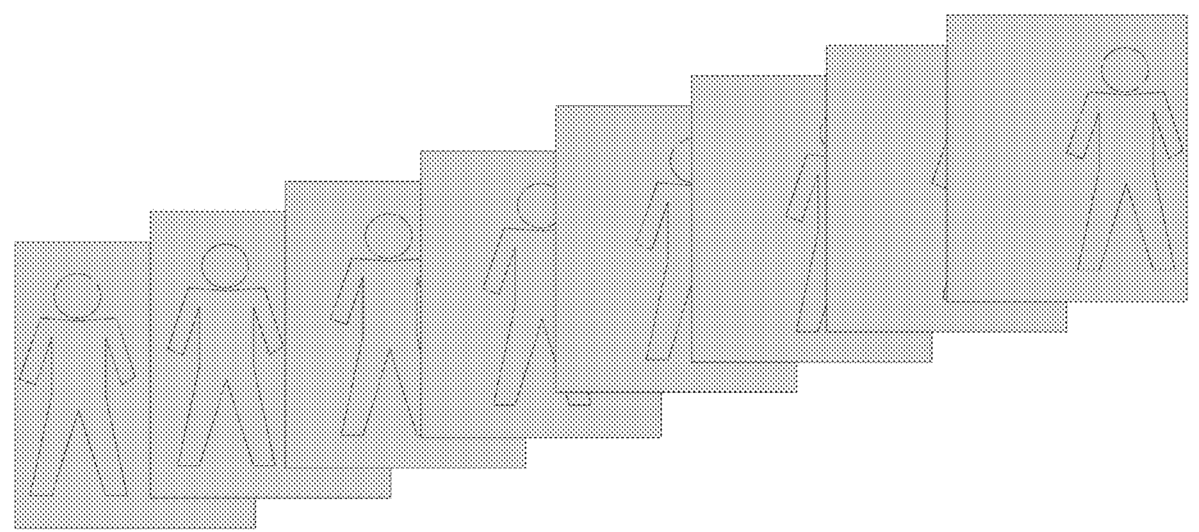
FIG. 2 shows images photographed from viewing angles of eight physical cameras.

Currently, acquiring photographed images from viewing angles of a plurality of cameras by using a three-dimensional vision technology means: first, camera type selection is performed to purchase a plurality of corresponding physical cameras; then the plurality of physical cameras are built on site to form a hardware camera acquisition system. For example, refer to FIG. 1, which is a schematic diagram showing eight physical cameras forming a hardware camera acquisition system; and finally, time synchronization further needs to be performed on the plurality of physical cameras, so that the plurality of physical cameras can synchronously acquire photographed images from viewing angles of the plurality of physical cameras, for example, to obtain photographed images, shown in FIG. 2, from viewing angles of eight physical cameras.

However, research shows that because each implementation step in the foregoing method is cumbersome and complicated and is limited by factors such as environment and hardware, it is difficult to ensure operation accuracy of each implementation step. This not only consumes a large amount of time and efforts, but also requires high hardware costs, resulting in great reduction of efficiency and an effect of acquiring the photographed images from the viewing angles of the plurality of cameras.

In view of this, this application provides a camera-based image acquisition method and a related apparatus. Because a three-dimensional model of a to-be-photographed object (also referred to as a "target object" or simply an "object") is imported in a three-dimensional virtual photographing scene to control a position and an attitude of the three-dimensional model, and a plurality of virtual cameras are laid out to control positions and attitudes of the plurality of virtual camera, there is no need to perform implementation steps such as purchasing a plurality of physical cameras, building a hardware camera acquisition system on site, and time synchronization of the physical cameras, and photographed images from viewing angles of the plurality of virtual cameras can be acquired quickly, accurately, and synchronously. In other words, according to this method, a large amount of time and efforts can be saved, hardware costs can be reduced, and efficiency and an effect of acquiring photographed images from the viewing angles of the plurality of cameras can be improved.

For case of understanding the technical solutions of this application, the camera-based image acquisition method according to the embodiments of this application is described below with reference to an actual application scenario.

Figure 3:
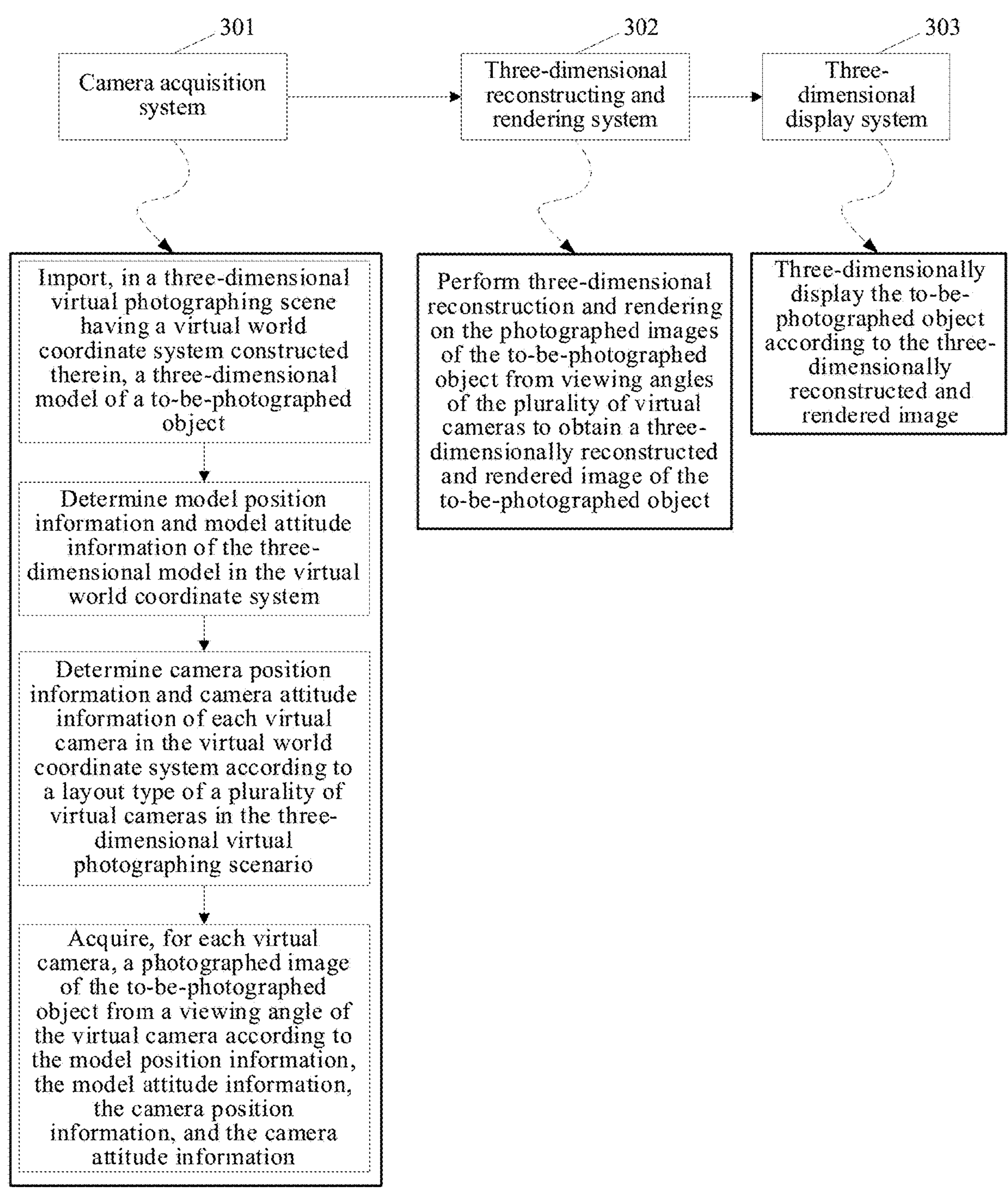
FIG. 3 is a schematic diagram showing an application scenario of a virtual-camera-based image acquisition method according to an embodiment of this application.

Refer to FIG. 3. FIG. 3 is a schematic diagram showing an application scenario of a virtual-camera-based image acquisition method according to an embodiment of this application. In the application scenario shown in FIG. 3, a camera acquisition system 301, a three-dimensional reconstructing and rendering system 302, and a three-dimensional display system 303 are included. The camera acquisition system 301 interacts with the three-dimensional reconstructing and rendering system 302, and the three-dimensional reconstructing and rendering system 302 interacts with the three-dimensional display system 303.

First, the camera acquisition system 301 pre-creates a three-dimensional virtual photographing scene, and constructs a virtual world coordinate system for the three-dimensional virtual photographing scene. On this basis, the camera acquisition system 301 imports, in the three-dimensional virtual photographing scene having the virtual world coordinate system constructed therein, a three-dimensional model of a to-be-photographed object. The to-be-photographed object is a physical object, for example, a conference participant of a virtual video conference. The three-dimensional model of the to-be-photographed object is a virtual three-dimensional model and is configured to replace the to-be-photographed object in the three-dimensional virtual photographing scene, so that a virtual camera arranged in the three-dimensional virtual photographing scene acquires a photographed picture of the to-be-photographed object.

As an example, the three-dimensional virtual photographing scene is a virtual video conference scenario, and the to-be-photographed object is a conference participant A. To acquire photographed images of the conference participant A from viewing angles of a plurality of cameras, the camera acquisition system 301 needs to import, in the virtual video conference scenario having a virtual world coordinate system constructed therein, a three-dimensional model of the conference participant A.

Then, the camera acquisition system 301 determines model position information and model attitude information of the three-dimensional model in the virtual world coordinate system. As an example, based on the foregoing example, by controlling a position and an attitude of the three-dimensional model in the virtual world coordinate system, the camera acquisition system 301 determines the model position information and the model attitude information of the three-dimensional model in the virtual world coordinate system.

Then, the camera acquisition system 301 determines camera position information and camera attitude information of each virtual camera in the virtual world coordinate system according to a layout pattern of a plurality of virtual cameras in the three-dimensional virtual photographing scene. As an example, based on the foregoing example, a quantity of the plurality of virtual cameras is six. By controlling a layout pattern of the six virtual cameras in the virtual video conference scenario to be a "surrounding type," the camera acquisition system 301 determines the camera position information and the camera attitude information of each virtual camera in the virtual world coordinate system according to the six virtual cameras laid out in the "surrounding type" in the virtual video conference scenario.

Then, the camera acquisition system 301 acquires, for each virtual camera, a photographed image of the to-be-photographed object from a viewing angle of the virtual camera according to the model position information, the model attitude information, the camera position information, and the camera attitude information. As an example, based on the foregoing example, the camera acquisition system 301 acquires, for each virtual camera, a photographed image of the conference participant A from a viewing angle of the virtual camera according to the model position information, the model attitude information, the camera position information, and the camera attitude information, to synchronously acquire photographed images of the conference participant A from viewing angles of the plurality of virtual cameras.

Finally, the camera acquisition system 301 sends the photographed images of the to-be-photographed object from the viewing angles of the plurality of virtual cameras to the three-dimensional reconstructing and rendering system 302. The three-dimensional reconstructing and rendering system 302 performs three-dimensional reconstruction and rendering on the photographed images of the to-be-photographed object from the viewing angles of the plurality of virtual cameras to obtain a three-dimensionally reconstructed and rendered image of the to-be-photographed object, and sends the three-dimensionally reconstructed and rendered image to the three-dimensional display system 303. The three-dimensional display system 303 three-dimensionally displays the to-be-photographed object according to the three-dimensionally reconstructed and rendered image. As an example, based on the foregoing example, the camera acquisition system 301 sends the photographed images of the conference participant A from the viewing angles of the plurality of virtual cameras to the three-dimensional reconstructing and rendering system 302. The three-dimensional reconstructing and rendering system 302 performs three-dimensional reconstruction and rendering on the photographed images of the conference participant A from the viewing angles of the plurality of virtual cameras to obtain a three-dimensionally reconstructed and rendered image of the conference participant A, and sends the three-dimensionally reconstructed and rendered image to the three-dimensional display system 303. The three-dimensional display system 303 three-dimensionally displays the conference participant A according to the three-dimensionally reconstructed and rendered image.

It can be learned that because a three-dimensional model of a to-be-photographed object is imported in a three-dimensional virtual photographing scene to control a position and an attitude of the three-dimensional model, and a plurality of virtual cameras are laid out to control positions and attitudes of the plurality of virtual camera, there is no need to perform implementation steps such as purchasing a plurality of physical cameras, building a hardware camera acquisition system on site, and time synchronization of the physical cameras, and photographed images from viewing angles of the plurality of virtual cameras can be acquired quickly, accurately, and synchronously. In other words, according to this method, a large amount of time and efforts can be saved, hardware costs can be reduced, and efficiency and an effect of acquiring photographed images from the viewing angles of the plurality of cameras can be improved.

The camera-based image acquisition method according to this application may be applied to a camera-based image acquisition device having data processing capabilities, for example, a server or a terminal device. The server may be an independent physical server, a server cluster or a distributed system formed by a plurality of physical servers, a cloud server that provides cloud computing services, or the like, but is not limited thereto. The terminal device includes but is not limited to a mobile phone, a tablet computer, a computer, a smart camera, a smart voice interaction device, a smart home appliance, a vehicle-mounted terminal, an acrial vehicle, or the like, but is not limited thereto. The terminal device is directly or indirectly connected to the server via wired or wireless communications, which is not limited in this application.

The camera-based image acquisition method according to this application may be applied in various scenarios, including but not limited to a cloud technology, artificial intelligence, vehicle-mounted scenarios, smart transportation, assisted driving, and the like.

A cloud technology is used in the camera-based image acquisition method according to this application. The cloud technology is a hosting technology that integrates resources, such as hardware, software, and networks, to implement data computing, storage, processing, and sharing in a wide area network or a local area network.

Cloud computing is a computing mode, in which computing tasks are distributed on a resource pool formed by a large quantity of computers, so that various application systems can obtain computing power, storage space, and information services according to requirements. A network that provides resources is referred to as a "cloud." For a user, resources in a "cloud" seem to be infinitely expandable, and can be obtained readily, used on demand, expanded readily, and paid according to use.

As a basic capability provider of cloud computing, a cloud computing resource pool (which is referred to as a cloud platform for short, and is generally referred to as an infrastructure as a service (IaaS)) platform is built, and a plurality of types of virtual resources are deployed in the resource pool for external customers to choose for use. The cloud computing resource pool mainly includes a computing device (which is a virtualized machine, including an operating system), a storage device, and a network device.

A cloud conference is an efficient, convenient, and cost-effective conference form based on the cloud computing technology. A user only needs to perform a simple operation on an Internet interface to quickly and efficiently share a speech, a data file, and a video with teams and customers all over the world synchronously. A cloud conference service provider helps the user to operate complex technologies such as data transmission and processing in the conference.

Currently, domestic cloud conferences mainly focus on service content mainly in the mode of software as a service (SaaS), including service forms such as a telephone, a network, and a video. A video conference based on the cloud computing is called a cloud conference.

In the cloud conference era, data transmission, processing, and storage are all performed by a computer resource of a video conference manufacturer, and a user no longer needs to purchase expensive hardware and install cumbersome software and only needs to open a browser to log into a corresponding interface to have an efficient remote conference.

A cloud conference system supports dynamic clustering deployment of a plurality of servers and provides a plurality of high-performance servers, which greatly improves conference stability, security, and availability. In recent years, video conferences are welcomed by many users and are widely applied in various fields because of greatly improved communication efficiency, continuously reduced communication costs, and internal management upgrade. Undoubtedly, after the cloud computing is applied, video conferences become more attractive in terms of convenience, speed, and ease of usage, which will surely stimulate arrival of a new upsurge in video conference applications.

The following uses a terminal device or a server as a camera-based image acquisition device to specifically describe the camera-based image acquisition method according to the embodiments of this application.

Figure 4:
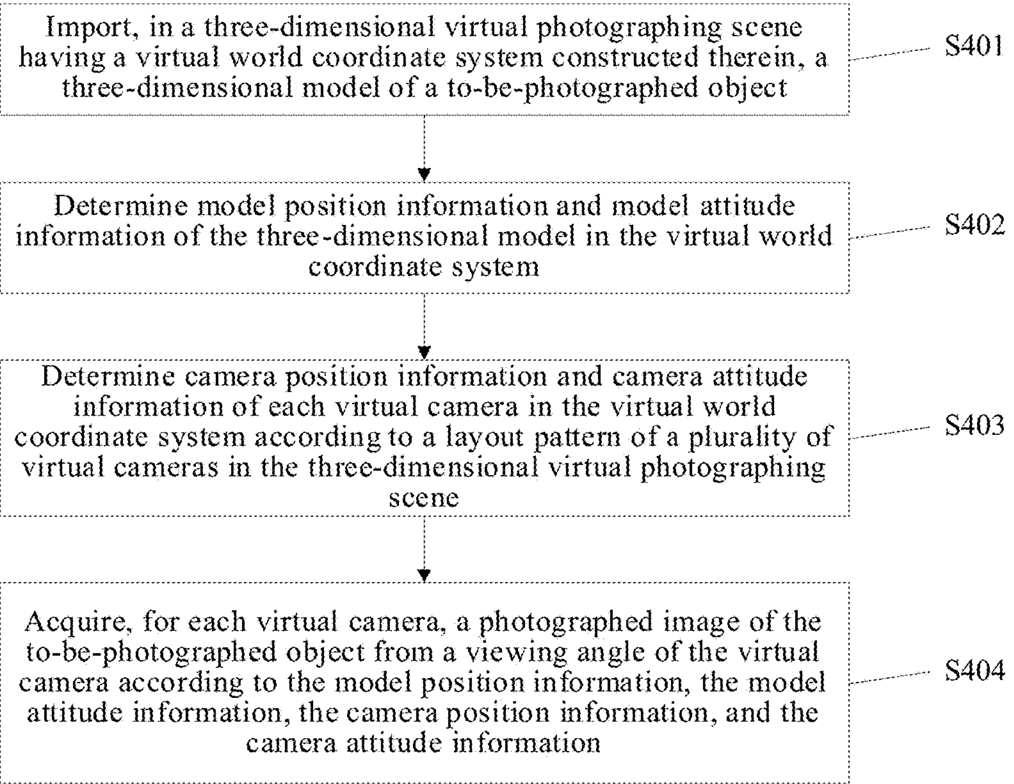
FIG. 4 is a flowchart of a virtual-camera-based image acquisition method according to an embodiment of this application.

FIG. 4 is a flowchart of a virtual-camera-based image acquisition method according to an embodiment of this application. As shown in FIG. 4, the camera-based image acquisition method includes the following steps:

S401: Import, in a three-dimensional virtual photographing scene having a virtual world coordinate system constructed therein, a three-dimensional model of a to-be-photographed object.

In related art, to acquire photographed images from viewing angles of a plurality of cameras by using a three-dimensional vision technology, first, camera type selection is performed to purchase a plurality of corresponding physical cameras, then the plurality of physical cameras are built on site to form a hardware camera acquisition system, and finally, time synchronization is performed on the plurality of physical cameras, so that the plurality of physical cameras can synchronously acquire photographed images from viewing angles of the plurality of physical cameras. Research shows that because each implementation step in the foregoing related art is cumbersome and complicated and is limited by factors such as environment and hardware, it is difficult to ensure operation accuracy of each implementation step. This not only consumes a large amount of time and efforts, but also requires high hardware costs, resulting in great reduction of efficiency and an effect of acquiring the photographed images from the viewing angles of the plurality of cameras.

Therefore, in the embodiments of this application, a virtual-simulated reality method is considered to avoid performing the foregoing implementation steps such as purchasing a plurality of physical cameras, building a hardware camera acquisition system on site, and time synchronization of the physical cameras in related art. In this case, a three-dimensional virtual photographing scene for simulating a three-dimensional real photographing scene needs to be pre-created, and a virtual world coordinate system is constructed for the three-dimensional virtual photographing scene, so that spatial points in the three-dimensional virtual photographing scene can be represented by coordinates in the virtual world coordinate system.

To simulate that the to-be-photographed object is in the three-dimensional real photographing scene, the three-dimensional model of the to-be-photographed object needs to be imported in the three-dimensional virtual photographing scene, so as to photograph the to-be-photographed object subsequently by photographing the three-dimensional model.

The three-dimensional model of the to-be-photographed object needs to include geometry information and material information of the to-be-photographed object. The geometry information of the to-be-photographed object is used for representing a spatial shape of the to-be-photographed object, and the material information of the to-be-photographed object is used for representing a material used by the to-be-photographed object. For example, the three-dimensional model of the to-be-photographed object is jointly represented by a triangle mesh and a corresponding texture map. A model format of the three-dimensional model of the to-be-photographed object may be obj, fbx, gltf, or the like.

S402: Determine model position information and model attitude information of the three-dimensional model in the virtual world coordinate system.

In the embodiments of this application, after the importing, in a three-dimensional virtual photographing scene having a virtual world coordinate system constructed therein, a three-dimensional model of a to-be-photographed object in S401 is performed, model position information and model attitude information of the three-dimensional model in the virtual world coordinate system may be determined. The model position information and the model attitude information may identify a specific position and a specific attitude of the imported three-dimensional model in the three-dimensional virtual photographing scene.

To simulate a position and an attitude of the to-be-photographed object in the three-dimensional real photographing scene, the position and the attitude of the three-dimensional model of the to-be-photographed object need to be configured in the three-dimensional virtual photographing scene, so that position information and attitude information of the three-dimensional model of the to-be-photographed object in the virtual world coordinate system can be determined as the model position information and the model attitude information.

S402 can include, for example, the following two specific implementations.

In a first specific implementation, the position and the attitude of the three-dimensional model of the to-be-photographed object is directly configured in the three-dimensional virtual photographing scene according to simulating requirements of the position and the attitude of the to-be-photographed object in the three-dimensional real photographing scene. On this basis, first, position configuration information and attitude configuration information of the three-dimensional model of the to-be-photographed object in the virtual world coordinate system may be obtained. Then, the model position information of the three-dimensional model of the to-be-photographed object in the virtual world coordinate system may be determined according to the position configuration information, and the model attitude information of the three-dimensional model of the to-be-photographed object in the virtual world coordinate system may be determined according to the attitude configuration information. Therefore, this application provides a possible implementation, and S402 may include, for example, the following S4021 and S4022.

S4021: Obtain position configuration information and attitude configuration information of the three-dimensional model in the virtual world coordinate system.

S4022: Determine the model position information and the model attitude information according to the position configuration information and the attitude configuration information.

In a second specific implementation, to enable the three-dimensional model of the to-be-photographed object in the three-dimensional virtual photographing scene to better meet the requirements of diversified motions of the to-be-photographed object in the three-dimensional real photographing scene, for an original position and an original attitude of the three-dimensional model of the to-be-photographed object in the three-dimensional virtual photographing scene, spatial transformation processing may further be performed on the three-dimensional model of the to-be-photographed object to obtain the three-dimensional model of the to-be-photographed object after the spatial transformation. On this basis, first, initial model position information, initial model attitude information, and spatial transformation information of the three-dimensional model of the to-be-photographed object in the virtual world coordinate system may be obtained. Then, the model position information and the model attitude information of the three-dimensional model of the to-be-photographed object in the virtual world coordinate system may be determined based on the initial model position information and the initial model attitude information and with reference to the spatial transformation information. Therefore, this application provides a possible implementation, and S402 may include, for example, the following S4023 and S4024.

S4023: Obtain initial model position information, initial model attitude information, and spatial transformation information of the three-dimensional model in the virtual world coordinate system.

S4024: Determine the model position information and the model attitude information according to the initial model position information, the initial model attitude information, and the spatial transformation information.

To simplify calculation and reduce an amount of computation, it can be assumed that the to-be-photographed object is a rigid body. Performing the spatial transformation processing on the three-dimensional model of the to-be-photographed object is actually performing similarity transformation processing, for example, rotation, translation, and scaling, on the overall three-dimensional model in space.

In addition, in the embodiments of this application, in a case that the to-be-photographed object has a plurality of structure parts, to accurately calculate and improve calculation accuracy, the to-be-photographed object may further be divided into the plurality of structure parts. In this case, the three-dimensional model of the to-be-photographed object includes a plurality of three-dimensional sub-models corresponding to the plurality of structure parts of the to-be-photographed object. On this basis, performing the spatial transformation processing on the three-dimensional model of the to-be-photographed object may be performing different spatial transformation processing on different three-dimensional sub-models in space. In this case, the spatial transformation information of the three-dimensional model of the to-be-photographed object includes a plurality of pieces of spatial transformation sub-information corresponding to the plurality of three-dimensional sub-models.

As an example, the to-be-photographed object is a conference participant A. The conference participant A may include a total of three structure parts including head, body, and limbs. In this case, a three-dimensional model of the conference participant A includes a three-dimensional sub-model corresponding to the head, a three-dimensional sub-model corresponding to the body, and a three-dimensional sub-model corresponding to the limbs. Head twisting, body turning, and limbs swinging of the conference participant A in the three-dimensional real photographing scene are simulated, and different spatial transformation processing are performed on the three-dimensional sub-model corresponding to the head, the three-dimensional sub-model corresponding to the body, and the three-dimensional sub-model corresponding to the limbs. In this case, spatial transformation information of the three-dimensional model of the conference participant A includes a plurality of pieces of spatial transformation sub-information corresponding to the three-dimensional sub-model corresponding to the head, the three-dimensional sub-model corresponding to the body, and the three-dimensional sub-model corresponding to the limbs.

S403: Determine camera position information and camera attitude information of each virtual camera in the virtual world coordinate system according to a layout pattern of a plurality of virtual cameras in the three-dimensional virtual photographing scene.

In the embodiments of this application, after the determining model position information and model attitude information of the three-dimensional model in the virtual world coordinate system in S402 is performed, to subsequently acquire the photographed images from the viewing angles of the plurality of cameras by using the three-dimensional vision technology, the plurality of physical cameras built on site in the three-dimensional real photographing scene are further simulated. In this case, a plurality of virtual cameras need to be laid out in the three-dimensional virtual photographing scene, and a position and an attitude of each virtual camera in the virtual world coordinate system depend on a layout pattern of the plurality of virtual cameras, so that camera position information and camera attitude information of each virtual camera in the virtual world coordinate system may be determined according to the layout pattern of the plurality of virtual cameras in the three-dimensional virtual photographing scene. The virtual camera may be a monocular camera or a binocular camera, which is not specifically limited in the embodiments of this application.

When S403 is specifically implemented, for each virtual camera, first, the positions of the plurality of virtual cameras need to be configured in the three-dimensional virtual photographing scene according to the layout pattern. In this case, the camera position information of the virtual camera in the virtual world coordinate system may be determined according to the layout pattern of the plurality of virtual cameras in the three-dimensional virtual photographing scene. Then, to enable the three-dimensional model of the to-be-photographed object to be at a picture center of the virtual camera, a position relationship between the three-dimensional model and the virtual camera needs to be determined according to the model position information of the three-dimensional model of the to-be-photographed object and the camera position information of the virtual camera. By configuring the attitude of the virtual camera in the three-dimensional virtual photographing scene according to the position relationship, the camera attitude information of the virtual camera in the virtual world coordinate system may be determined. Therefore, this application provides a possible implementation, and S403 may include, for example, the following S4031 to S4033.

S4031: Determine the camera position information according to the layout pattern.

Determining the layout pattern may, for example, use the following two specific implementations.

In a first specific implementation, the layout pattern of the plurality of virtual cameras is directly configured in the three-dimensional virtual photographing scene according to layout requirements of the plurality of virtual cameras. On this basis, first, layout configuration information of the plurality of virtual cameras in the virtual world coordinate system may be obtained. Then, the layout pattern of the plurality of virtual cameras in the virtual world coordinate system may be determined according to the layout configuration information. Therefore, this application provides a possible implementation, and determining steps of the layout pattern may include, for example, the following S1 and S2.

S1: Obtain layout configuration information of the plurality of virtual cameras in the three-dimensional virtual photographing scene.

S2: Determine the layout pattern according to the layout configuration information.

In a second specific implementation, to enable the plurality of virtual cameras in the three-dimensional virtual photographing scene to better meet the requirements of diversified layout patterns of the plurality of physical cameras in the three-dimensional real photographing scene, for an original layout pattern of the plurality of virtual cameras in the three-dimensional virtual photographing scene, layout adjustment may further be performed on the plurality of virtual cameras to obtain the plurality of virtual cameras after the layout adjustment. On this basis, first, an initial layout pattern and layout adjustment information of the plurality of virtual cameras in the virtual world coordinate system may be obtained. Then, the layout pattern of the plurality of virtual cameras in the virtual world coordinate system may be determined based on the initial layout pattern and with reference to the layout adjustment information. Therefore, this application provides a possible implementation, and determining steps of the layout pattern may include, for example, the following S3 and S4.

S3: Obtain an initial layout pattern and layout adjustment information of the plurality of virtual cameras in the three-dimensional virtual photographing scene.

S4: Determine the layout pattern according to the initial layout pattern and the layout adjustment information.

In related art, to implement different layout patterns, for example, a "surrounding type," an "up-down type," or a "four-corner type," of the plurality of physical cameras, disassembly and reassembly need to be performed on the plurality of physical cameras in the hardware camera acquisition system built on site. This method is limited by hardware debugging, which not only has cumbersome implementation steps, but also consumes a large amount of time. It is inconvenient to verify differences and effects of different layout patterns of the plurality of virtual cameras on acquiring the photographed images from the viewing angles of the plurality of cameras. In the implementation of S3 and S4 in the embodiments of this application, the original layout pattern of the plurality of virtual cameras is directly adjusted in the three-dimensional virtual photographing scene. Without hardware debugging, different layout patterns of the plurality of virtual cameras can be implemented quickly and easily, the photographed images from the viewing angles of the plurality of virtual cameras can be acquired quickly, efficiently, and cost-effectively in different layout patterns of the plurality of virtual cameras, so that differences and effects of different layout patterns of the plurality of virtual cameras on acquiring the photographed images from the viewing angles of the plurality of cameras are verified conveniently.

Figure 5:
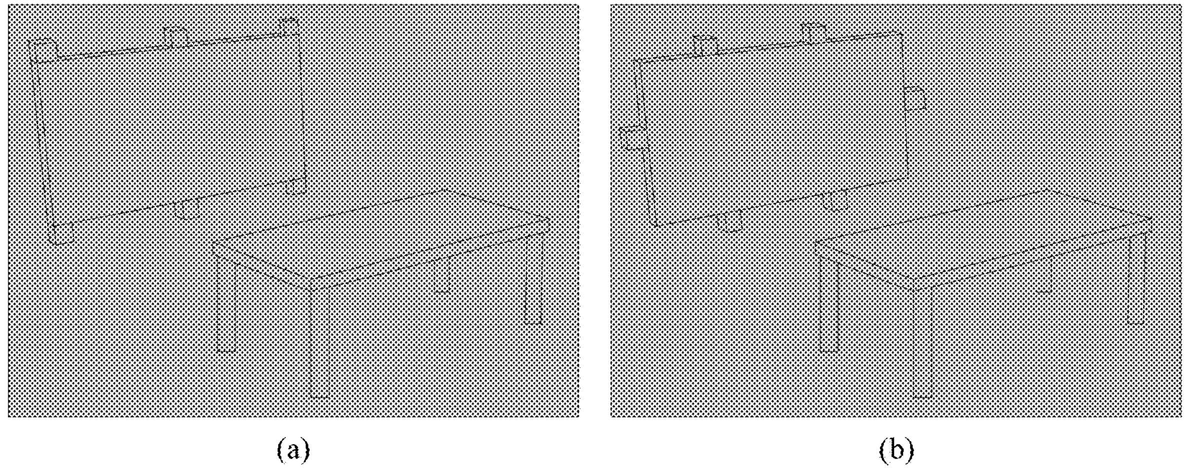
FIG. 5 is a schematic diagram showing different layout patterns of a plurality of virtual cameras in a three-dimensional virtual photographing scene according to an embodiment of this application.

As an example, refer to FIG. 5, which is a schematic diagram showing different layout patterns of a plurality of virtual cameras in a three-dimensional virtual photographing scene. The three-dimensional virtual photographing scene is a virtual video conference scenario. A to-be-photographed object is a table. A quantity of the plurality of virtual cameras is six, and small blocks in the figure represent the virtual cameras. Section (a) in FIG. 5 shows that the six virtual cameras in the virtual video conference scenario are arranged in an "up-down" layout pattern facing the table and around a screen in front of the table. Section (b) in FIG. 5 shows that the six virtual cameras in the virtual video conference scenario are arranged in a "surrounding" layout pattern facing the table and around a screen in front of the table.

S4032: Determine a position relationship between the three-dimensional model and the virtual camera according to the model position information and the camera position information.

S4033: Perform attitude adjustment on the virtual camera according to the position relationship, to determine the camera attitude information.

Figure 6:
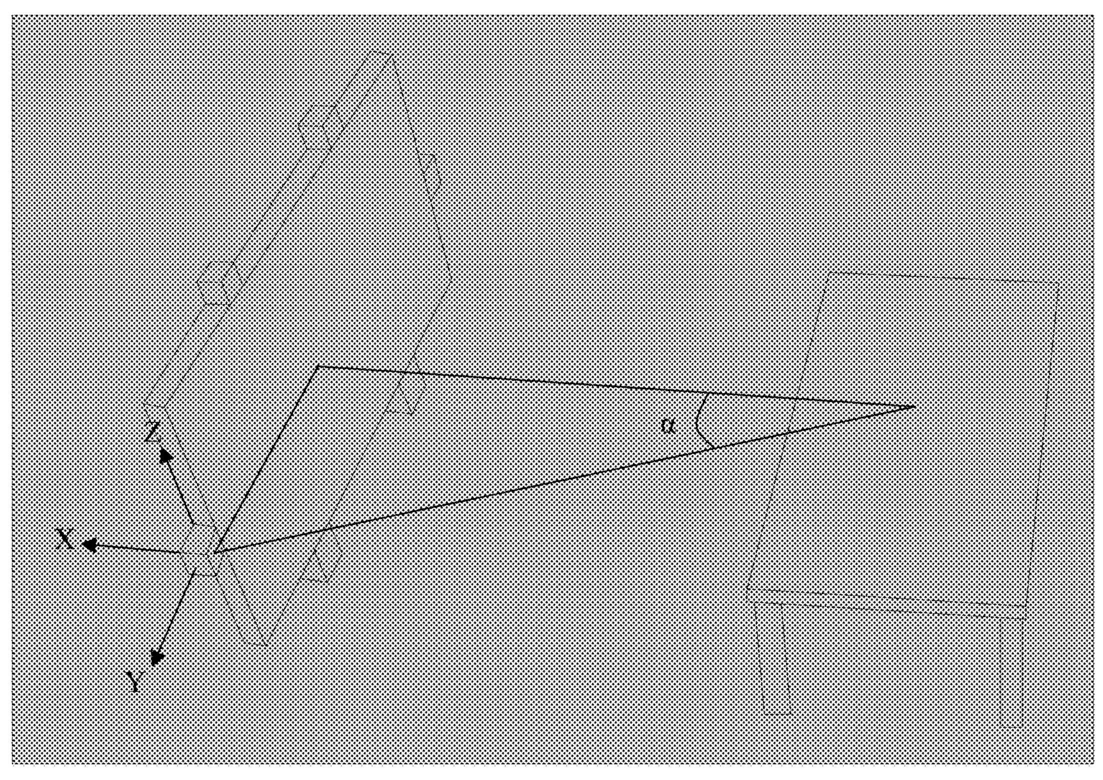
FIG. 6 is a schematic diagram showing performing attitude adjustment on a virtual camera according to an embodiment of this application.

As an example, refer to FIG. 6, which is a schematic diagram showing performing attitude adjustment on a virtual camera. Based on section (b) in FIG. 5, for a virtual camera at a left side of the screen, to enable a three-dimensional model of the table to be at a picture center of the virtual camera, a position relationship between the three-dimensional model of the table and the virtual camera is determined according to model position information of the three-dimensional model of the table and camera position information of the virtual camera, and the virtual camera is rotated by an a angle about a Z-axis toward the table according to the position relationship. The a angle is obtained by calculating a trigonometric function relationship marked in the figure. Similarly, virtual cameras at the top of the screen need to rotate by a specific angle about a Y-axis toward the table.

S404: Acquire, for each virtual camera, a photographed image of the to-be-photographed object from a viewing angle of the virtual camera according to the model position information, the model attitude information, the camera position information, and the camera attitude information.

In the embodiments of this application, after the determining model position information and model attitude information of the three-dimensional model of the to-be-photographed object in the virtual world coordinate system and camera position information and camera attitude information of each virtual camera in S402 and S403 are performed, for each virtual camera, an image acquisition device may accurately determine a relative position and an attitude relationship in the three-dimensional virtual photographing scene between the three-dimensional model and the virtual camera according to the model position information, the model attitude information, the camera position information, and the camera attitude information, so that a picture of the three-dimensional model relative to the virtual camera in the three-dimensional virtual photographing scene may be acquired by the virtual camera. In this way, the photographed image of the to-be-photographed object from the viewing angle of the virtual camera is acquired efficiently and conveniently in high precision, to provide a basis for subsequently implementing high-precision three-dimensional reconstruction and rendering of the to-be-photographed object.

When S404 is specifically implemented, for each virtual camera, first, a distance of the three-dimensional model of the to-be-photographed object relative to the virtual camera, that is, a depth of the three-dimensional model of the to-be-photographed object relative to the virtual camera, may be determined according to the model position information and the model attitude information of the three-dimensional model of the to-be-photographed object in the virtual world coordinate system and the camera position information and the camera attitude information of the virtual camera. Then, an extrinsic parameter of the virtual camera may be determined according to the camera position information and the camera attitude information of the virtual camera in the virtual world coordinate system. Finally, rendering may be performed on the image from the viewing angle of the virtual camera based on the distance of the three-dimensional model of the to-be-photographed object relative to the virtual camera and the extrinsic parameter of the virtual camera and with reference to a preset intrinsic parameter of the virtual camera, to implement acquisition of the photographed image from the viewing angle of the virtual camera. Therefore, this application provides a possible implementation, and S404 may include, for example, the following S4041 to S4043.

S4041: Determine, for each virtual camera, a distance between the three-dimensional model and the virtual camera according to the model position information, the model attitude information, the camera position information, and the camera attitude information.

In related art, a depth of a to-be-photographed object relative to a virtual camera is estimated based on a time-of-flight principle, and due to a problem of multi-path interference, measurement precision is low, and the depth is estimated inaccurately. However, in the implementation of S4041 in the embodiments of this application, the model position information and the model attitude information of the three-dimensional model of the to-be-photographed object in the virtual world coordinate system and the camera position information and the camera attitude information of the virtual camera are all known information, and the depth of the three-dimensional model of the to-be-photographed object relative to the virtual camera may be accurately calculated, so that accuracy of the depth can be improved.

S4042: Determine an extrinsic parameter of the virtual camera according to the camera position information and the camera attitude information.

As an example, the following equation is used to determine the extrinsic parameter of the virtual camera.

$$\begin{aligned}\begin{bmatrix} R & t \\ 0 & 1 \end{bmatrix} &= \begin{bmatrix} R_C & C \\ 0 & 1 \end{bmatrix}^{-1} \\ &= \left[\begin{bmatrix} I & C \\ 0 & 1 \end{bmatrix}\begin{bmatrix} R_C & 0 \\ 0 & 1 \end{bmatrix}\right]^{-1} \\ &= \begin{bmatrix} R_C & 0 \\ 0 & 1 \end{bmatrix}^{-1}\begin{bmatrix} I & C \\ 0 & 1 \end{bmatrix}^{-1} \\ &= \begin{bmatrix} R_C^T & 0 \\ 0 & 1 \end{bmatrix}\begin{bmatrix} I & -C \\ 0 & 1 \end{bmatrix} \\ &= \begin{bmatrix} R_C^T & -R_C^T C \\ 0 & 1 \end{bmatrix}\end{aligned}$$

R represents attitude information of coordinate axes in the virtual world coordinate system in a virtual camera coordinate system of the virtual camera. t represents position information of a coordinate origin in the virtual world coordinate system in the virtual camera coordinate system of the virtual camera. C represent the camera position information of the virtual camera in the virtual world coordinate system. $R_C$ represents the camera attitude information of the virtual camera in the virtual world coordinate system. I represents an identity matrix.

In related art, to implement extrinsic parameter calibration of a physical camera, image features need to be first extracted based on structure from motion (SfM), and feature matching estimates an initial extrinsic parameter of the physical camera. Then, point clouds are registered based on an iterative closest point (ICP) algorithm, to calculate a final extrinsic parameter of the physical camera. In this method, in a case that there is no texture or repeated texture in a to-be-photographed object, feature matching estimation is inaccurate, leading to an estimation error in the extrinsic parameter of the camera. However, in the implementation of S4042 in the embodiments of this application, the camera position information and the camera attitude information of the virtual camera in the virtual world coordinate system are all known information, and the extrinsic parameter of the virtual camera may be accurately calculated, so that an estimation error in the extrinsic parameter of the camera can be avoided.

S4043: Acquire the photographed image according to the distance, the extrinsic parameter, and a preset intrinsic parameter of the virtual camera.

The preset intrinsic parameter of the virtual camera is a known inherent attribute of the virtual camera, and is related to characteristics of an image sensor in the virtual camera and errors of a lens. The preset intrinsic parameter usually includes a focal length, principal point offset, lens distortion, and the like. To diversify simulation of different physical cameras, in the three-dimensional virtual photographing scene, the preset intrinsic parameter of the virtual camera may further be randomly adjusted to obtain intrinsic parameter adjustment information of the preset intrinsic parameter. The preset intrinsic parameter is set as the intrinsic parameter according to the intrinsic parameter adjustment information of the preset intrinsic parameter, so that rendering may be performed on the image from the viewing angle of the virtual camera based on the distance of the three-dimensional model of the to-be-photographed object relative to the virtual camera and the extrinsic parameter of the virtual camera and with reference to the intrinsic parameter of the virtual camera, to implement acquisition of the photographed image from the viewing angle of the virtual camera. Therefore, this application provides a possible implementation, and the method further may include, for example, the following S5 and S6.

S5: Obtain intrinsic parameter adjustment information of the preset intrinsic parameter.

S6: Set the preset intrinsic parameter as the intrinsic parameter according to the intrinsic parameter adjustment information of the preset intrinsic parameter.

Correspondingly, S4043 may, for example, include: acquiring the photographed image according to the distance, the extrinsic parameter, and the intrinsic parameter.

In addition, in the embodiments of this application, to enable the acquisition of the photographed image of the to-be-photographed object from the viewing angle of the virtual camera to be more diversified, an illumination condition of the three-dimensional virtual photographing scene may further be configured, for example, a light source and light intensity are configured, to simulate a three-dimensional real photographing scene under different illumination conditions. On this basis, first, illumination configuration information of the three-dimensional virtual photographing scene may be obtained. Then the illumination condition of the three-dimensional virtual photographing scene may be determined according to the illumination configuration information, so that when S404 is performed, a photographed image of the to-be-photographed object from the viewing angle of the virtual camera that satisfies the illumination condition is acquired with reference to the illumination condition. Therefore, this application provides a possible implementation, and the method further may include, for example, the following S7 and S8.

S7: Obtain illumination configuration information of the three-dimensional virtual photographing scene.

S8: Determine an illumination condition of the three-dimensional virtual photographing scene according to the illumination configuration information.

Correspondingly, S404 may, for example, include: acquiring, for each virtual camera according to the model position information, the model attitude information, the camera position information, the camera attitude information, and the illumination condition, a photographed image that satisfies the illumination condition.

Figure 7:
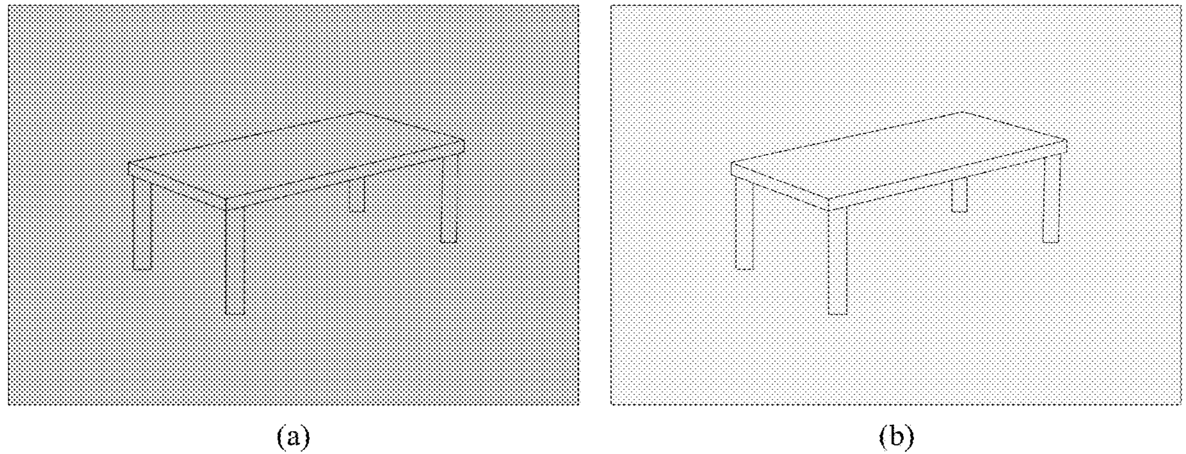
FIG. 7 is a schematic diagram showing three-dimensional models of a to-be-photographed object under different illumination conditions in a three-dimensional virtual photographing scene according to an embodiment of this application.

As an example, based on the foregoing FIG. 5 and FIG. 6, refer to FIG. 7, which is a schematic diagram showing three-dimensional models of a to-be-photographed object under different illumination conditions in a three-dimensional virtual photographing scene according to an embodiment of this application. Section (a) in FIG. 7 shows a three-dimensional model of a table in which a light source is added in a virtual video conference scenario. Section (b) in FIG. 7 shows a three-dimensional model of a table in which two light sources are added in a virtual video conference scenario.

In addition, in related art, detection of phase offset based on a time-of-flight principle requires a plurality of sampling integrations and consumes a large quantity of resources, resulting in low image resolution of the acquired photographed image of the to-be-photographed object, which is not conducive to subsequent high-precision three-dimensional reconstruction and rendering. Therefore, in the embodiments of this application, to increase an image attribute of the photographed image of the to-be-photographed object, the image attribute of the photographed image may be further configured, so as to facilitate subsequent high-precision three-dimensional reconstruction and rendering. On this basis, first, image attribute configuration information of the photographed image may be obtained. Then, image attribute information of the photographed image may be determined according to the image attribute configuration information, so that when S404 is performed, a photographed image of the to-be-photographed object from the viewing angle of the virtual camera that satisfies the image attribute information is acquired with reference to the image attribute information. Therefore, this application provides a possible implementation, and the method further may include, for example, the following S9 and S10.

S9: Obtain image attribute configuration information of the photographed image.

The acquired photographed image of the to-be-photographed object is mainly used for the subsequent high-precision three-dimensional reconstruction and rendering, and this needs to ensure the image attribute, such as an image resolution and an image frame rate, of the photographed image. Therefore, the image attribute configuration information may, for example, include image resolution configuration information or image frame rate configuration information.

S10: Determine image attribute information of the photographed image according to the image attribute configuration information.

Correspondingly, S404 may, for example, include: acquiring, for each virtual camera according to the model position information, the model attitude information, the camera position information, the camera attitude information, and the image attribute information, a photographed image that satisfies the image attribute information.

In addition, in the embodiments of this application, to enable a background image of the photographed image of the to-be-photographed object to be diversified, the background image of the photographed image may further be rendered to obtain photographed images of the to-be-photographed object in different backgrounds. On this basis, first, background rendering information of the photographed image may be obtained. Then, a preset background image of the photographed image may be rendered to the background image according to the background rendering information. Therefore, this application provides a possible implementation, and the method further may include, for example, S11 and S12.

S11: Obtain background rendering information of the photographed image.

S12: Render a preset background image of the photographed image into a background image according to the background rendering information.

Figure 8:
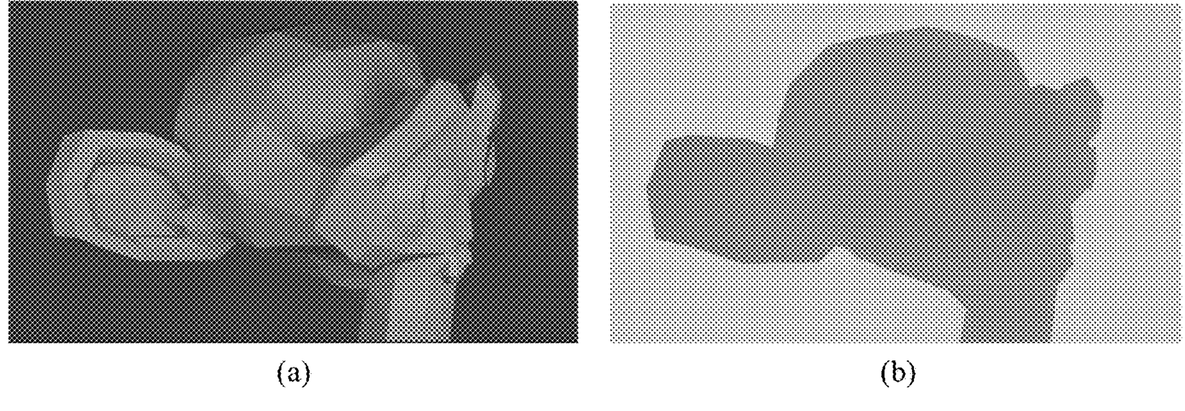
FIG. 8 is a schematic diagram showing a photographed image of a to-be-photographed object from a viewing angle of a virtual camera according to an embodiment of this application.

Based on the foregoing descriptions, refer to FIG. 8, which is a schematic diagram showing a photographed image of a to-be-photographed object from a viewing angle of a virtual camera according to an embodiment of this application. The to-be-photographed object is a Suzanne monkey model. Section (a) in FIG. 8 shows a color image of the Suzanne monkey model from the viewing angle of the virtual camera. Section (b) in FIG. 8 shows a depth image of the Suzanne monkey model from the viewing angle of the virtual camera.

According to the camera-based image acquisition method according to the foregoing embodiments, a virtual world coordinate system is constructed for a three-dimensional virtual photographing scene and a three-dimensional model of a to-be-photographed object is imported in the three-dimensional virtual photographing scene; model position information and model attitude information of the three-dimensional model in the virtual world coordinate system are determined; camera position information and camera attitude information of each virtual camera in the virtual world coordinate system are determined according to a target layout pattern of a plurality of virtual cameras in the virtual photographing scene; and for each virtual camera, a photographed image of the to-be-photographed object from a viewing angle of the virtual camera is acquired according to the model position information, the model attitude information, the camera position information, and the camera attitude information. It can be learned that because a three-dimensional model of a to-be-photographed object is imported in a three-dimensional virtual photographing scene to control a position and an attitude of the three-dimensional model, and a plurality of virtual cameras are laid out to control positions and attitudes of the plurality of virtual camera, there is no need to perform implementation steps such as purchasing a plurality of physical cameras, building a hardware camera acquisition system on site, and time synchronization of the physical cameras, and photographed images from viewing angles of the plurality of virtual cameras can be acquired quickly, accurately, and synchronously. In other words, according to this method, a large amount of time and efforts can be saved, hardware costs can be reduced, and efficiency and an effect of acquiring photographed images from the viewing angles of the plurality of cameras can be improved.

Figure 9:
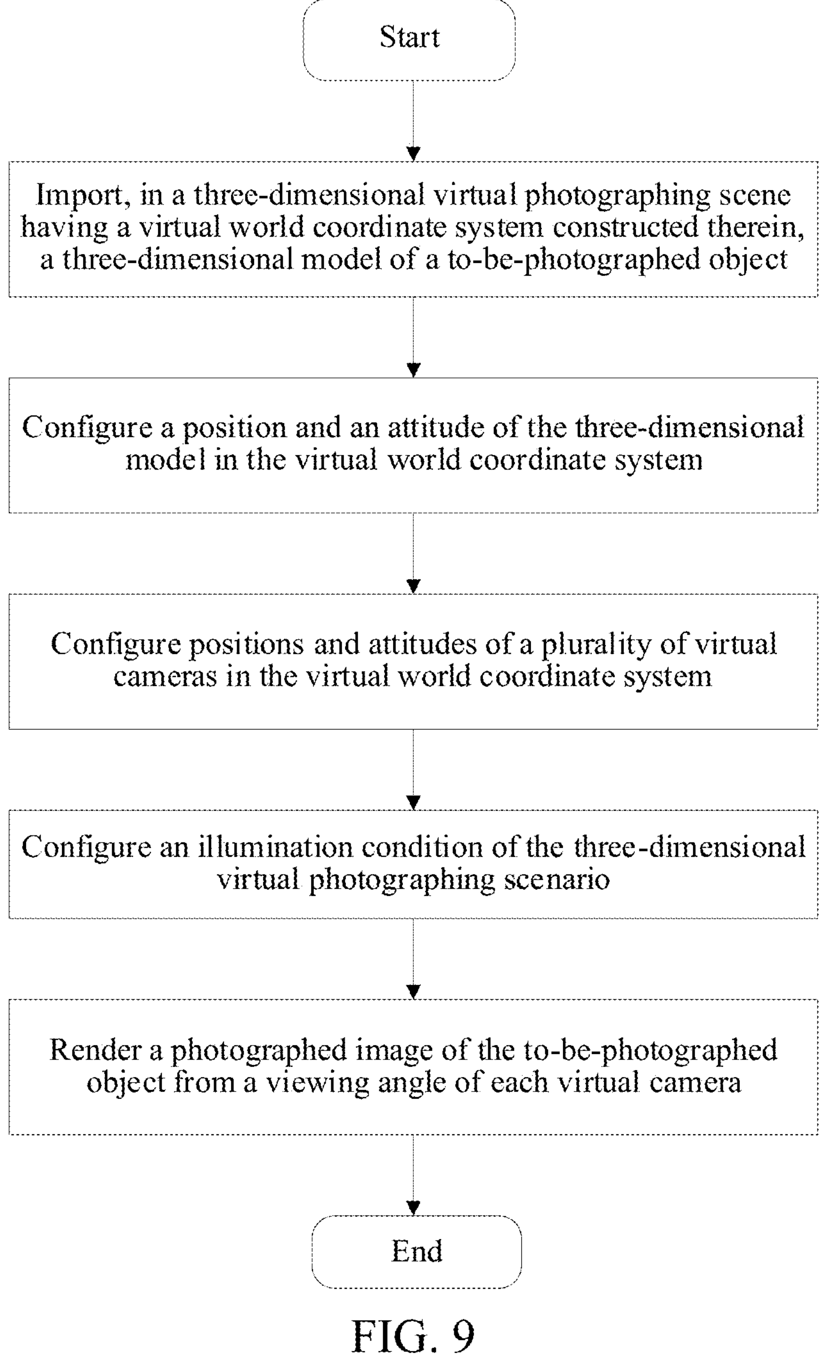
FIG. 9 is a schematic flowchart of performing steps corresponding to a virtual-camera-based image acquisition method according to an embodiment of this application.

Corresponding to the foregoing camera-based image acquisition method, refer to FIG. 9, which shows a schematic flowchart of performing steps corresponding to a virtual-camera-based image acquisition method according to an embodiment of this application. The performing steps are as follows:

Step 1: Import, in a three-dimensional virtual photographing scene having a virtual world coordinate system constructed therein, a three-dimensional model of a to-be-photographed object.

Step 2: Configure a position and an attitude of the three-dimensional model in the virtual world coordinate system.

Step 3: Configure positions and attitudes of a plurality of virtual cameras in the virtual world coordinate system.

Step 4: Configure an illumination condition of the three-dimensional virtual photographing scene.

Step 5: Render a photographed image of the to-be-photographed object from a viewing angle of each virtual camera.

Figure 10:
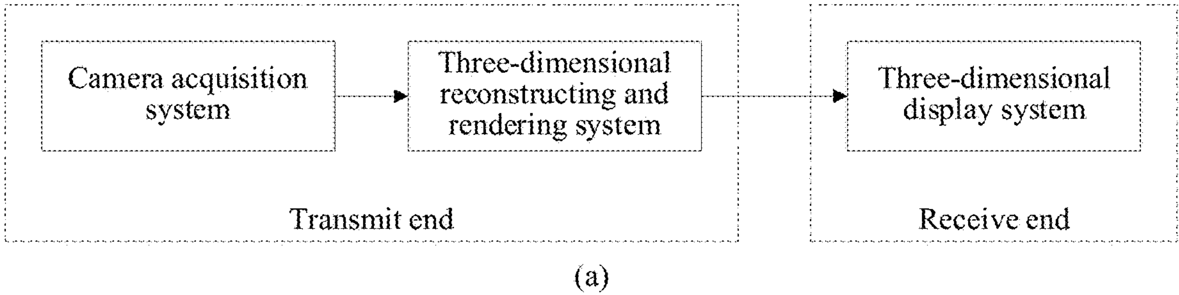
FIG. 10 is a schematic diagram showing different system architectures of a product according to an embodiment of this application.
Figure 10:
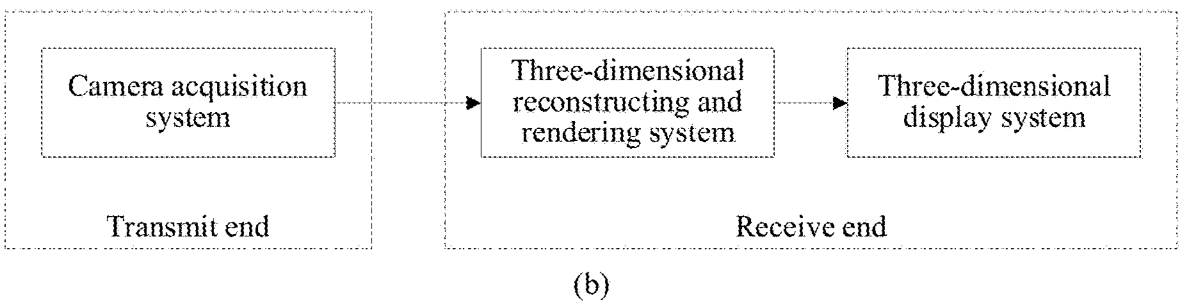

In addition, the foregoing camera-based image acquisition method is applied in a camera acquisition system in a system architecture of a product. Refer to FIG. 10, which is a schematic diagram showing different system architectures of a product. The product includes the camera acquisition system, a three-dimensional reconstructing and rendering system, and a three-dimensional display system. The camera acquisition system is deployed at a transmit end. The three-dimensional reconstructing and rendering system may be deployed at the transmit end or a receive end. The three-dimensional display system is deployed at the receive end. Section (a) in FIG. 10 shows that the three-dimensional reconstructing and rendering system is deployed at the transmit end. Section (b) in FIG. 10 shows that the three-dimensional reconstructing and rendering system is deployed at the receive end.

The camera acquisition system sends photographed images of a to-be-photographed object from viewing angles of a plurality of virtual cameras to the three-dimensional reconstructing and rendering system. The three-dimensional reconstructing and rendering system performs three-dimensional reconstruction and rendering on the photographed images of the to-be-photographed object from the viewing angles of the plurality of virtual cameras to obtain a three-dimensionally reconstructed and rendered image of the to-be-photographed object, and sends the three-dimensionally reconstructed and rendered image to the three-dimensional display system. The three-dimensional display system three-dimensionally displays the to-be-photographed object according to the three-dimensionally reconstructed and rendered image of the to-be-photographed object.

For the camera-based image acquisition method according to the foregoing embodiments, an embodiment of this application further provides a camera-based image acquisition apparatus.

Figure 11:
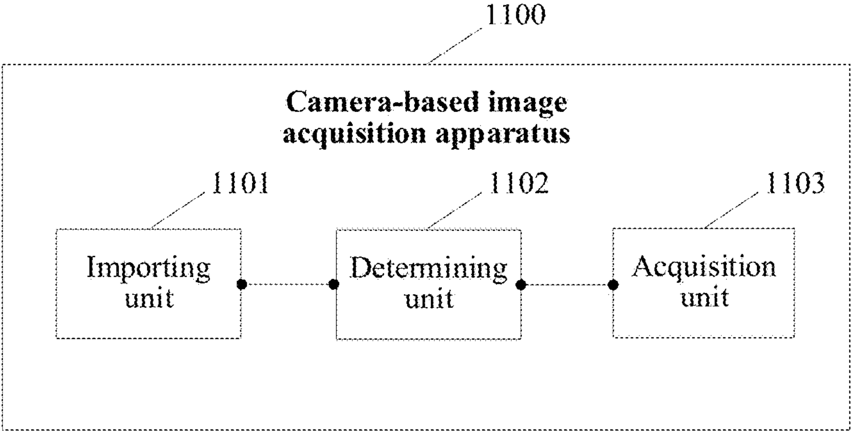
FIG. 11 is a schematic diagram of a virtual-camera-based image acquisition apparatus according to an embodiment of this application.

Refer to FIG. 11. FIG. 11 is a schematic diagram of a virtual-camera-based image acquisition apparatus according to an embodiment of this application. As shown in FIG. 11, the camera-based image acquisition apparatus 1100 includes an importing unit 1101, a determining unit 1102, and an acquisition unit 1103.

The importing unit 1101 is configured to import, in a three-dimensional virtual photographing scene having a virtual world coordinate system constructed therein, a three-dimensional model of a to-be-photographed object.

The determining unit 1102 is configured to determine model position information and model attitude information of the three-dimensional model in the virtual world coordinate system.

The determining unit 1102 is further configured to determine, according to a layout pattern of a plurality of virtual cameras in the three-dimensional virtual photographing scene, camera position information and camera attitude information of each virtual camera in the virtual world coordinate system.

The acquisition unit 1103 is configured to acquire, for each virtual camera according to the model position information, the model attitude information, the camera position information, and the camera attitude information, a photographed image of the to-be-photographed object from a viewing angle of the virtual camera.

In a possible implementation, the determining unit 1102 is configured to:

determine the camera position information according to the layout pattern;

determine a position relationship between the three-dimensional model and the virtual camera according to the model position information and the camera position information; and perform attitude adjustment on the virtual camera according to the position relationship, and determine the camera attitude information.

In a possible implementation, the acquisition unit 1103 is configured to:

determine, for each virtual camera, a distance between the three-dimensional model and the virtual camera according to the model position information, the model attitude information, the camera position information, and the camera attitude information;

determine an extrinsic parameter of the virtual camera according to the camera position information and the camera attitude information; and acquire the photographed image according to the distance, the extrinsic parameter, and a preset intrinsic parameter of the virtual camera.

In a possible implementation, the determining unit 1102 is further configured to:

obtain layout configuration information of the plurality of virtual cameras in the three-dimensional virtual photographing scene; and determine the layout pattern according to the layout configuration information.

In a possible implementation, the determining unit 1102 is further configured to:

obtain an initial layout pattern and layout adjustment information of the plurality of virtual cameras in the three-dimensional virtual photographing scene; and determine the layout pattern according to the initial layout pattern and the layout adjustment information.

In a possible implementation, the determining unit 1102 is configured to:

obtain position configuration information and attitude configuration information of the three-dimensional model in the virtual world coordinate system; and determine the model position information and the model attitude information according to the position configuration information and the attitude configuration information.

In a possible implementation, the determining unit 1102 is configured to:

obtain initial model position information, initial model attitude information, and spatial transformation information of the three-dimensional model in the virtual world coordinate system; and determine the model position information and the model attitude information according to the initial model position information, the initial model attitude information, and the spatial transformation information.

In a possible implementation, in a case that the to-be-photographed object includes a plurality of structure parts, the three-dimensional model includes a plurality of three-dimensional sub-models corresponding to the plurality of structure parts, and the spatial transformation information includes a plurality of spatial transformation sub-information corresponding to the plurality of three-dimensional sub-models.

In a possible implementation, the apparatus further includes a first obtaining unit.

The first obtaining unit is configured to obtain illumination configuration information of the three-dimensional virtual photographing scene.

The determining unit 1102 is further configured to determine, according to the illumination configuration information, an illumination condition of the three-dimensional virtual photographing scene.

The acquisition unit 1103 is configured to acquire, for each virtual camera according to the model position information, the model attitude information, the camera position information, the camera attitude information, and the illumination condition, a photographed image that satisfies the illumination condition.

In an implementation, the apparatus further includes a second obtaining unit.

The second obtaining unit is configured to obtain image attribute configuration information of the photographed image.

The determining unit 1102 is further configured to determine, according to the image attribute configuration information, image attribute information of the photographed image.

The acquisition unit 1103 is configured to acquire, for each virtual camera according to the model position information, the model attitude information, the camera position information, the camera attitude information, and the image attribute information, a photographed image that satisfies the image attribute information.

In an implementation, the apparatus further includes a third obtaining unit and a rendering unit.

The third obtaining unit is configured to obtain background rendering information of the photographed image.

The rendering unit is configured to render, according to the background rendering information, a preset background image of the photographed image into a background image.

According to the camera-based image acquisition apparatus according to the foregoing embodiments, a virtual world coordinate system is constructed for a three-dimensional virtual photographing scene and a three-dimensional model of a to-be-photographed object is imported in the three-dimensional virtual photographing scene; model position information and model attitude information of the three-dimensional model in the virtual world coordinate system are determined; camera position information and camera attitude information of each virtual camera in the virtual world coordinate system are determined according to a target layout pattern of a plurality of virtual cameras in the virtual photographing scene; and for each virtual camera, a photographed image of the to-be-photographed object from a viewing angle of the virtual camera is acquired according to the model position information, the model attitude information, the camera position information, and the camera attitude information. It can be learned that because a three-dimensional model of a to-be-photographed object is imported in a three-dimensional virtual photographing scene to control a position and an attitude of the three-dimensional model, and a plurality of virtual cameras are laid out to control positions and attitudes of the plurality of virtual camera, there is no need to perform implementation steps such as purchasing a plurality of physical cameras, building a hardware camera acquisition system on site, and time synchronization of the physical cameras, and photographed images from viewing angles of the plurality of virtual cameras can be acquired quickly, accurately, and synchronously. In other words, according to this method, a large amount of time and efforts can be saved, hardware costs can be reduced, and efficiency and an effect of acquiring photographed images from the viewing angles of the plurality of cameras can be improved.

For the camera-based image acquisition method described above, an embodiment of this application further provides a camera-based image acquisition device, to implement and apply the foregoing camera-based image acquisition method in practice. The following describes the computer device according to the embodiments of this application from the perspective of hardware materialization.

Figure 12:
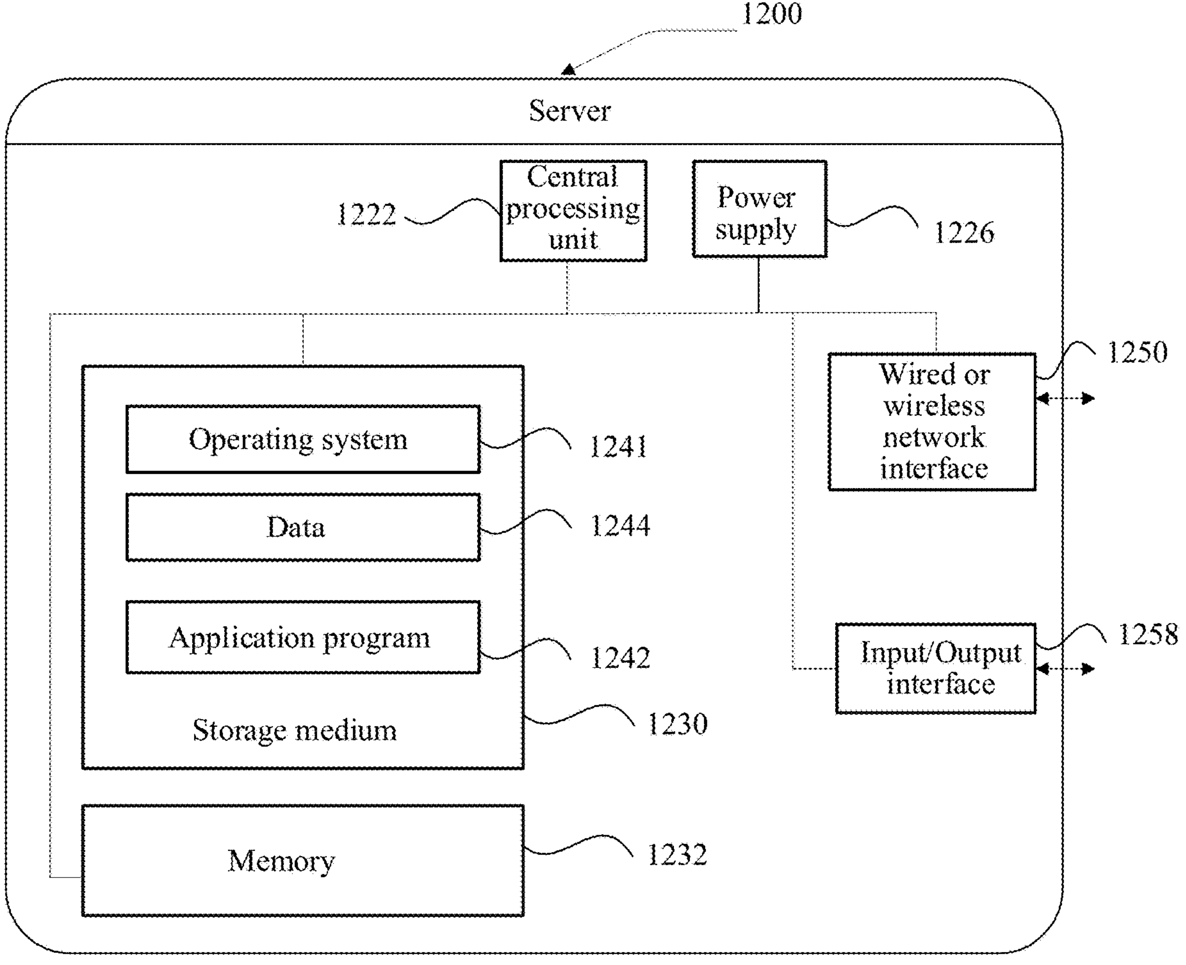
FIG. 12 is a schematic structural diagram of a server according to an embodiment of this application.

Refer to FIG. 12. FIG. 12 is a schematic structural diagram of a server according to an embodiment of this application. The server 1200 may vary greatly due to different configurations or performance, and may include one or more central processing units (CPUs) 1222 (for example, one or more processors) and a memory 1232, and one or more storage media 1230 (for example, one or more mass storage devices) that store application programs 1242 or data 1244. The memory 1232 and the storage medium 1230 may be used for temporary storage or persistent storage. A program stored in the storage medium 1230 may include one or more modules (not shown), and each module may include a series of instruction operations on the server. Further, the central processing unit 1222 may be configured to communicate with the storage medium 1230 and perform on the server 1200 the series of instruction operations in the storage medium 1230.

The server 1200 may further include one or more power supplies 1226, one or more wired or wireless network interfaces 1250, one or more input/output interfaces 1258, and/or one or more operating systems 1241, for example, Windows Server™, Mac OS X™, Unix™, Linux™, or FreeBSD™.

Steps performed by the server in the foregoing embodiments may be based on the structure of the server shown in FIG. 12.

The CPU 1222 is configured to perform the following steps:

- importing, in a three-dimensional virtual photographing scene having a virtual world coordinate system constructed therein, a three-dimensional model of a to-be-photographed object;
- determining model position information and model attitude information of the three-dimensional model in the virtual world coordinate system;
- determining camera position information and camera attitude information of each virtual camera in the virtual world coordinate system according to a layout pattern of a plurality of virtual cameras in the three-dimensional virtual photographing scene; and
- acquiring, for each virtual camera, a photographed image of the to-be-photographed object from a viewing angle of the virtual camera according to the model position information, the model attitude information, the camera position information, and the camera attitude information.

In some embodiments, the CPU 1222 may further perform method steps of any specific implementation of the camera-based image acquisition method in the embodiments of this application.

Figure 13:
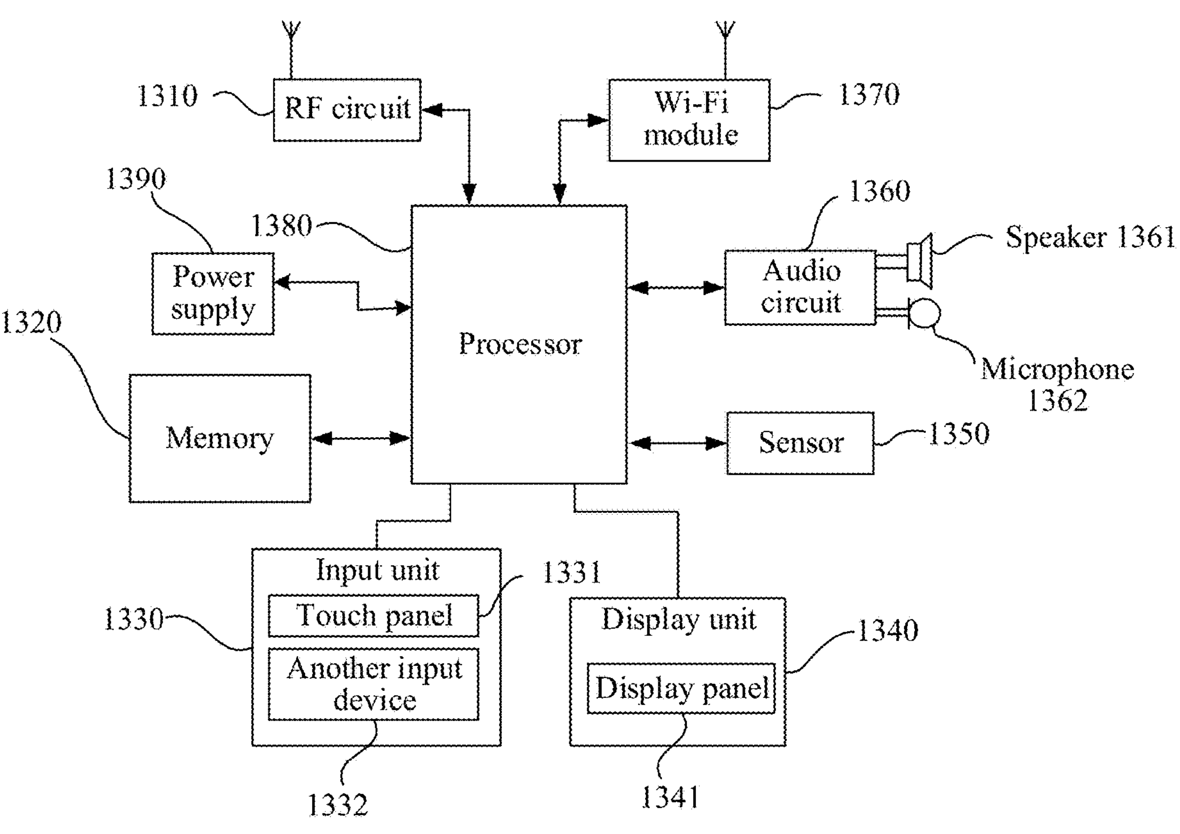
FIG. 13 is a schematic structural diagram of a terminal device according to an embodiment of this application.

Refer to FIG. 13. FIG. 13 is a schematic structural diagram of a terminal device according to an embodiment of this application. For ease of description, only a part related to this embodiment of this application is shown. For specific technical details not disclosed, refer to the method part in the embodiments of this application. The terminal device may be any terminal device including a mobile phone, a tablet computer, or a PDA. An example in which the terminal device is a mobile phone is used.

FIG. 13 shows a part of a mobile phone related to a terminal device according to an embodiment of this application. Refer to FIG. 13. The mobile phone includes components such as a radio frequency (RF) circuit 1310, a memory 1320, an input unit 1330, a display unit 1340, a sensor 1350, an audio circuit 1360, a wireless fidelity (Wi-Fi) module 1370, a processor 1380, and a power supply 1390. A person skilled in the art may understand that the structure, shown in FIG. 13, of the mobile phone does not constitute a limitation on the mobile phone, and the mobile phone may include more or fewer components than those shown in the figure, or a combination of some components, or a different component deployment may be used.

The following specifically describes the components of the mobile phone with reference to FIG. 13.

The RF circuit 1310 may be configured to receive and send a signal during information receiving and sending. Particularly, after receiving downlink information from a base station, the RF circuit 1310 sends the information to the processor 1380 for processing.

The memory 1320 may be configured to store a software program and a module.

The processor 1380 runs the software program and the module stored in the memory 1320 to implement various functional applications and data processing of the mobile phone.

The input unit 1330 may be configured to receive input digit or character information, and generate a key signal input related to user settings and function control of the mobile phone. Specifically, the input unit 1330 may include a touch panel 1331 and another input device 1332.

The display unit 1340 may be configured to display information input by a user or information provided for the user, and various menus of the mobile phone. The display unit 1340 may include a display panel 1341.

The mobile phone may further include at least one sensor 1350.

The audio circuit 1360, a speaker 1361, and a microphone 1362 may provide audio interfaces between the user and the mobile phone.

The processor 1380 is a control center of the mobile phone, and is connected to various parts of the entire mobile phone by using various interfaces and lines. By running or executing the software program and/or the module stored in the memory 1320, and invoking data stored in the memory 1320, the processor 1380 performs various functions of the mobile phone and performs data processing, to perform overall control on the mobile phone.

Although not shown in the figure, the mobile phone may further include a camera, a Bluetooth module, and the like, which are not further described herein.

In the embodiments of this application, the memory 1320 included in the mobile phone may store program code and transmit the program code to the processor.

The processor 1380 included in the mobile phone may perform the camera-based image acquisition method according to the foregoing embodiments according to instructions in the program code.

An embodiment of this application further provides a non-transitory computer-readable storage medium, configured to store a computer program, the computer program being configured to perform the camera-based image acquisition method according to the foregoing embodiments.

An embodiment of this application further provides a computer program product or a computer program, the computer program product or the computer program including computer instructions stored in a non-transitory computer-readable storage medium. A processor of the computer device reads the computer instructions from the computer-readable storage medium. The processor executes the computer instructions to enable the computer device to perform the camera-based image acquisition method according to various optional implementations in the foregoing aspects.

A person of ordinary skill in the art may understand that all or some steps for implementing the foregoing method embodiments may be completed by a program instructing related hardware, the foregoing program may be stored in a non-transitory computer-readable storage medium, and when being executed, the program performs steps including the foregoing method embodiments. In addition, the foregoing storage medium may be at least one of the following media: any medium that can store program code, such as a read-only memory (ROM), a random access memory (RAM), a magnetic disk, or an optical disc.

The embodiments of this specification are all described in a progressive manner, for same or similar parts in the embodiments, refer to these embodiments, and descriptions of each embodiment focus on a difference from other embodiments. Especially, device and system embodiments are basically similar to the method embodiments, and therefore are described briefly. For related parts, refer to partial descriptions in the method embodiments. The described device and system embodiments are merely examples. The units described as separate parts may or may not be physically separated, and the parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments without creative efforts.

The foregoing descriptions are merely a specific implementation of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image acquisition method comprising:

importing a three-dimensional model of an object into a three-dimensional virtual photographing scene having a virtual world coordinate system;

determining model position information and model attitude information of the three-dimensional model in the virtual world coordinate system;

determining, according to a layout pattern of a plurality of virtual cameras in the three-dimensional virtual photographing scene, camera position information and camera attitude information of each of the plurality of virtual cameras in the virtual world coordinate system, wherein the determining the camera position information and the camera attitude information of each of the plurality of virtual cameras in the virtual world coordinate system comprises: determining the camera position information according to the layout pattern; determining a position relationship between the three-dimensional model and the virtual camera according to the model position information and the camera position information; and performing attitude adjustment on the virtual camera according to the position relationship, to determine the camera attitude information, such that the three-dimensional model is at a picture center of the virtual camera; and acquiring, for each of the plurality of virtual cameras, an image of the object from a viewing angle of the virtual camera according to the model position information, the model attitude information, the camera position information, and the camera attitude information.

2. The method according to claim 1, wherein acquiring, for each of the plurality of virtual cameras, the image of the object from the viewing angle of the virtual camera includes, for each virtual camera:

determining a distance between the three-dimensional model and the virtual camera according to the model position information, the model attitude information, the camera position information, and the camera attitude information;

determining an extrinsic parameter of the virtual camera according to the camera position information and the camera attitude information; and acquiring the image according to the distance, the extrinsic parameter, and a preset intrinsic parameter of the virtual camera.

3. The method according to claim 1, further comprising: determining the layout pattern, including:

obtaining layout configuration information of the plurality of virtual cameras in the three-dimensional virtual photographing scene; and determining the layout pattern according to the layout configuration information.

4. The method according to claim 1, further comprising: determining the layout pattern, including:

obtaining an initial layout pattern and layout adjustment information of the plurality of virtual cameras in the three-dimensional virtual photographing scene; and determining the layout pattern according to the initial layout pattern and the layout adjustment information.

5. The method according to claim 1, wherein determining the model position information and the model attitude information of the three-dimensional model in the virtual world coordinate system includes:

obtaining position configuration information and attitude configuration information of the three-dimensional model in the virtual world coordinate system; and determining the model position information and the model attitude information according to the position configuration information and the attitude configuration information.

6. The method according to claim 1, wherein determining the model position information and the model attitude information of the three-dimensional model in the virtual world coordinate system includes:

obtaining initial model position information, initial model attitude information, and spatial transformation information of the three-dimensional model in the virtual world coordinate system; and determining the model position information and the model attitude information according to the initial model position information, the initial model attitude information, and the spatial transformation information.

7. The method according to claim 6, wherein:

the object includes a plurality of structure parts;

the three-dimensional model includes a plurality of three-dimensional sub-models corresponding to the plurality of structure parts; and the spatial transformation information includes a plurality of pieces of spatial transformation sub-information corresponding to the plurality of three-dimensional sub-models.

8. The method according to claim 1, further comprising:

obtaining illumination configuration information of the three-dimensional virtual photographing scene; and determining an illumination condition of the three-dimensional virtual photographing scene according to the illumination configuration information;

wherein acquiring, for each of the plurality of virtual cameras, the image of the object from the viewing angle of the virtual camera includes:

acquiring, for each virtual camera according to the model position information, the model attitude information, the camera position information, the camera attitude information, and the illumination condition, an image that satisfies the illumination condition.

9. The method according to claim 1, further comprising:

obtaining image attribute configuration information of the image; and determining image attribute information of the image according to the image attribute configuration information;

wherein acquiring, for each of the plurality of virtual cameras, the image of the object from the viewing angle of the virtual camera includes:

acquiring, for each virtual camera according to the model position information, the model attitude information, the camera position information, the camera attitude information, and the image attribute information, an image that satisfies the image attribute information.

10. The method according to claim 1, further comprising:

obtaining background rendering information of the image; and rendering a preset background image of the image into a background image according to the background rendering information.

11. A computer device comprising:

one or more processors; and one or more memories storing one or more computer programs that, when executed by the one or more processors, cause the one or more processors to:

import a three-dimensional model of an object into a three-dimensional virtual photographing scene having a virtual world coordinate system;

determine model position information and model attitude information of the three-dimensional model in the virtual world coordinate system;

determine, according to a layout pattern of a plurality of virtual cameras in the three-dimensional virtual photographing scene, camera position information and camera attitude information of each of the plurality of virtual cameras in the virtual world coordinate system, the determining the camera position information and the camera attitude information of each of the plurality of virtual cameras in the virtual world coordinate system comprising: determining the camera position information according to the layout pattern; determining a position relationship between the three-dimensional model and the virtual camera according to the model position information and the camera position information; and performing attitude adjustment on the virtual camera according to the position relationship, to determine the camera attitude information, such that the three-dimensional model is at a picture center of the virtual camera; and acquire, for each of the plurality of virtual cameras, an image of the object from a viewing angle of the virtual camera according to the model position information, the model attitude information, the camera position information, and the camera attitude information.

12. The computer device according to claim 11, wherein the one or more computer programs further cause the one or more processors to:

determine a distance between the three-dimensional model and the virtual camera according to the model position information, the model attitude information, the camera position information, and the camera attitude information;

determine an extrinsic parameter of the virtual camera according to the camera position information and the camera attitude information; and acquire the image according to the distance, the extrinsic parameter, and a preset intrinsic parameter of the virtual camera.

13. The computer device according to claim 11, wherein the one or more computer programs further cause the one or more processors to:

determine the layout pattern, including:

obtaining layout configuration information of the plurality of virtual cameras in the three-dimensional virtual photographing scene; and determining the layout pattern according to the layout configuration information.

14. The computer device according to claim 11, wherein the one or more computer programs further cause the one or more processors to:

determine the layout pattern, including:

obtaining an initial layout pattern and layout adjustment information of the plurality of virtual cameras in the three-dimensional virtual photographing scene; and determining the layout pattern according to the initial layout pattern and the layout adjustment information.

15. The computer device according to claim 11, wherein the one or more computer programs further cause the one or more processors to:

obtain position configuration information and attitude configuration information of the three-dimensional model in the virtual world coordinate system; and determine the model position information and the model attitude information according to the position configuration information and the attitude configuration information.

16. The computer device according to claim 11, wherein the one or more computer programs further cause the one or more processors to:

obtain initial model position information, initial model attitude information, and spatial transformation information of the three-dimensional model in the virtual world coordinate system; and determine the model position information and the model attitude information according to the initial model position information, the initial model attitude information, and the spatial transformation information.

17. The computer device according to claim 16, wherein:

the object includes a plurality of structure parts;

the three-dimensional model includes a plurality of three-dimensional sub-models corresponding to the plurality of structure parts; and the spatial transformation information includes a plurality of pieces of spatial transformation sub-information corresponding to the plurality of three-dimensional sub-models.

18. A non-transitory computer-readable storage medium storing one or more computer programs that, when executed by one or more processors, cause the one or more processors to:

import a three-dimensional model of an object into a three-dimensional virtual photographing scene having a virtual world coordinate system;

determine model position information and model attitude information of the three-dimensional model in the virtual world coordinate system;

determine, according to a layout pattern of a plurality of virtual cameras in the three-dimensional virtual photographing scene, camera position information and camera attitude information of each of the plurality of virtual cameras in the virtual world coordinate system, the determining the camera position information and the camera attitude information of each of the plurality of virtual cameras in the virtual world coordinate system comprising: determining the camera position information according to the layout pattern; determining a position relationship between the three-dimensional model and the virtual camera according to the model position information and the camera position information; and performing attitude adjustment on the virtual camera according to the position relationship, to determine the camera attitude information, such that the three-dimensional model is at a picture center of the virtual camera; and acquire, for each of the plurality of virtual cameras, an image of the object from a viewing angle of the virtual camera according to the model position information, the model attitude information, the camera position information, and the camera attitude information.

* * * * *